United States Patent
Gibson

(10) Patent No.: US 9,033,657 B2
(45) Date of Patent: May 19, 2015

(54) GAS TURBINE ENGINE INCLUDING LIFT-OFF FINGER SEALS, LIFT-OFF FINGER SEALS, AND METHOD FOR THE MANUFACTURE THEREOF

(75) Inventor: Nathan Gibson, Tempe, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 649 days.

(21) Appl. No.: 13/316,922

(22) Filed: Dec. 12, 2011

(65) Prior Publication Data

US 2013/0149143 A1  Jun. 13, 2013

(51) Int. Cl.
| | |
|---|---|
| F04D 29/057 | (2006.01) |
| F16J 15/16 | (2006.01) |
| F16J 15/32 | (2006.01) |
| F04D 29/10 | (2006.01) |
| B23P 15/00 | (2006.01) |

(52) U.S. Cl.
CPC ......... *F04D 29/057* (2013.01); *Y10T 29/49826* (2015.01); *F16J 15/164* (2013.01); *F16J 15/3244* (2013.01); *F16J 15/3288* (2013.01); *F04D 29/102* (2013.01); *B23P 15/00* (2013.01)

(58) Field of Classification Search
CPC ... F01D 11/001; F01D 11/02; F05D 2240/55; F05D 2240/57; F05D 2240/59; F04D 29/057; F04D 29/102; F16J 15/3288; F16J 15/164; F16J 15/3244; F16J 15/3292; B23P 15/00
USPC ............ 415/170.1, 174.2, 230, 231; 277/355
See application file for complete search history.

(56) References Cited

U.S. PATENT DOCUMENTS

| | | | |
|---|---|---|---|
| 2,866,656 | A | 12/1958 | Dobrosavljevic |
| 3,863,938 | A | 2/1975 | Nicholson |
| 4,178,046 | A | 12/1979 | Silver et al. |
| 4,738,453 | A | 4/1988 | Ide |
| 5,042,823 | A | 8/1991 | Mackay et al. |
| 5,100,158 | A | 3/1992 | Gardner |
| 5,246,295 | A | 9/1993 | Ide |
| 5,370,402 | A | 12/1994 | Gardner et al. |
| 5,385,409 | A | 1/1995 | Ide |

(Continued)

OTHER PUBLICATIONS

Braun, M. J. et al.: "Structural and Dynamic Considerations towards the Design of a Padded Finger Seal" 39th AIAA/ASME/SAE/ASEE Joint Propulsion Conference AIAA, Huntsville, Alabama, Jul. 20-23, 2003.

*Primary Examiner* — Edward Look
*Assistant Examiner* — Danielle M Christensen
(74) *Attorney, Agent, or Firm* — Ingrassia Fisher & Lorenz, P.C.

(57) ABSTRACT

Embodiments of a gas turbine engine including a lift-off finger seal are provided, as are embodiments of a lift-off finger seal and embodiments of a method for the manufacture thereof. In one embodiment, the gas turbine engine includes an engine housing having low and high pressure cavities, a shaft rotatably mounted in the engine housing, and a lift-off finger seal. The lift-off finger seal includes an finger seal backing spring and an aerodynamic foil. The aerodynamic foil extends around the outer circumference of the shaft and is configured to expand radially outward in response to aerodynamic forces generated during rotation of the shaft. The finger seal backing spring resiliently biases the aerodynamic foil toward the shaft, deflects to accommodate the outward radial expansion of the aerodynamic foil, and forms an annular seal around the aerodynamic foil to impede pressurized airflow from the high to low pressure zone.

18 Claims, 6 Drawing Sheets

(56) References Cited

U.S. PATENT DOCUMENTS

| | | |
|---|---|---|
| 5,632,493 A | 5/1997 | Gardner |
| 5,755,445 A | 5/1998 | Arora |
| 6,267,381 B1 | 7/2001 | Wright |
| 6,364,316 B1 | 4/2002 | Arora |
| 6,428,009 B2 * | 8/2002 | Justak ............ 277/355 |
| 6,505,837 B1 | 1/2003 | Heshmat |
| 6,752,533 B2 | 6/2004 | Saville et al. |
| 6,811,154 B2 | 11/2004 | Proctor et al. |
| 7,077,573 B2 | 7/2006 | Suh et al. |
| 7,108,488 B2 | 9/2006 | Larue et al. |
| 7,726,660 B2 * | 6/2010 | Datta ............ 277/411 |
| 7,735,833 B2 | 6/2010 | Braun et al. |
| 8,028,996 B2 | 10/2011 | Ruggiero et al. |
| 2004/0155410 A1 | 8/2004 | Proctor et al. |
| 2006/0249912 A1 | 11/2006 | Wilson, Jr. |
| 2007/0120327 A1 * | 5/2007 | Justak ............ 277/355 |
| 2008/0122183 A1 | 5/2008 | Braun et al. |
| 2010/0087346 A1 | 4/2010 | Giesler et al. |
| 2011/0211783 A1 | 9/2011 | Ishimoto |
| 2013/0149143 A1 | 6/2013 | Gibson |

* cited by examiner

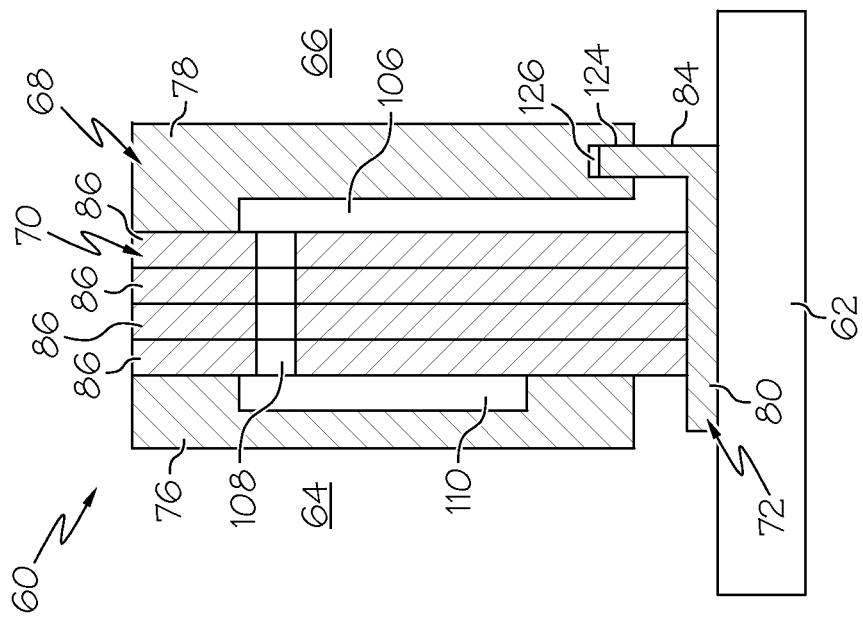
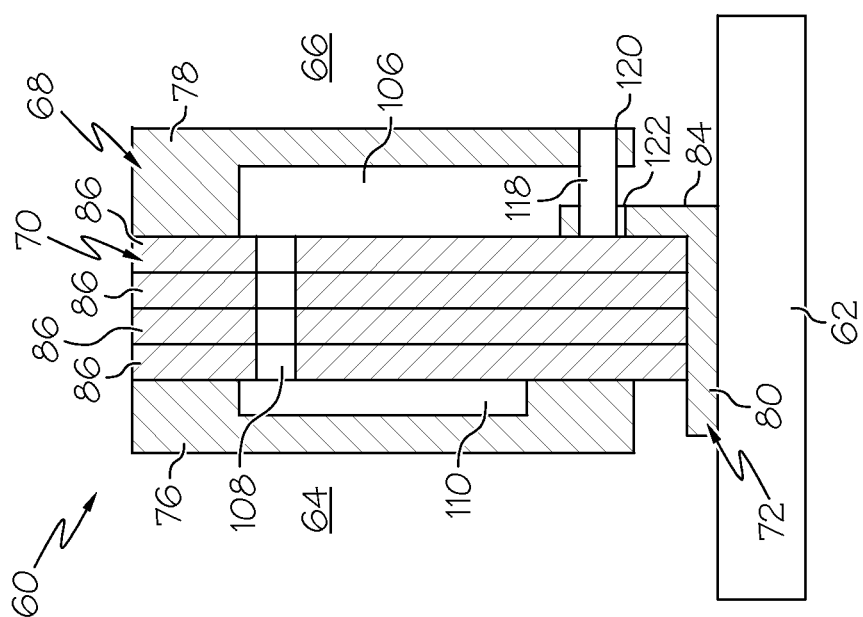

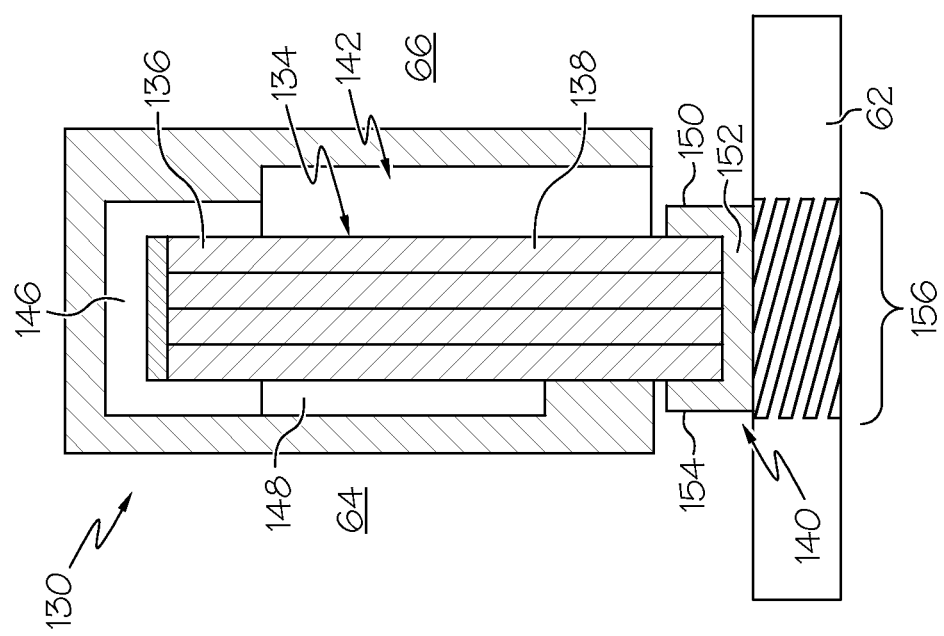

GAS TURBINE ENGINE INCLUDING LIFT-OFF FINGER SEALS, LIFT-OFF FINGER SEALS, AND METHOD FOR THE MANUFACTURE THEREOF

TECHNICAL FIELD

The present invention relates generally to shaft seals and, more particularly, to gas turbine engine including lift-off finger seals, as well as to lift-off finger seals and methods for the manufacture of lift-off finger seals.

BACKGROUND

During operation, a gas turbine engine compresses intake air, mixes the compressed air with fuel, and ignites the fuel-air mixture to produce combustive gasses, which are then expanded through a number of air turbines to drive rotation of the turbines and produce power. Significant quantities of energy are expended to compress the intake air before the hot, compressed air is supplied to the engine's combustion chamber for fuel injection and combustion. Leakage of the compressed air from the compressor section, especially from the downstream end of the high pressure compressor stage, results in a direct penalty against the engine's power-to-weight ratio and overall fuel efficiency. For this reason, air-to-air shaft seals are commonly positioned around the engine spools or shafts to reduce the leakage of pressurized airflow from the high pressure compressor section and other such high pressure zones of the engine to neighboring areas of the engine containing lower air pressures. Traditionally, labyrinth seals have been widely utilized in view of their relative simplicity and low cost. In one common design, the labyrinth seal includes a plurality of rotating disks or knives, which are affixed to the shaft and which are separated from a neighboring stationary structure (e.g., a land) by a small axial gap to provide a relatively low, predictable leakage through the seal during engine operation.

While providing a relatively low initial leakage, the integrity of a labyrinth seal can degrade over time due to intermittent contact between the spinning disks of the labyrinth seal and neighboring static components. Contact between spinning and static components may occur due to radial displacement of the shaft as the engine transitions through critical modes and/or as radial impulse forces are imparted to rotor assembly during aircraft maneuvering, hard touchdown, and the like. As an alternative to labyrinth seals, finger seals have been developed that include a plurality of elongated fingers, which extend radially inward from a static structure to contact and form an annular seal around the shaft. The fingers are radially resilient and thus able to deflect to accommodate radial displacement of the shaft. Advantageously, finger seals typically provide superior sealing performance as compared to labyrinth seals; however, finger seals are also subject to wear due to their contacting design and may require a lengthy break-in process to ensure proper seal operation. Additionally, the constant rubbing between the fingers and the rapidly spinning shaft may generate significant quantities of heat, which can potentially damage the finger seal or the shaft. It has been suggested that relatively large, axially-extending pads may be joined to the inner terminal ends of the fingers to promote seal lift-off during high speed rotation of the shaft. However, such axially-elongated finger pads tend to be relatively poor at achieving and sustaining seal lift-off due, at least in part, to the formation of divergent wedges between the inner surfaces of the finger pads and the outer surface of the rotating shaft. Furthermore, even when able to achieve and sustain seal lift-off, such finger pads tend to impart undesirable twisting forces to the torsionally-soft fingers thus interfering with proper operation of the seal.

It would thus be desirable to provide embodiments of a lift-off finger seal suitable for forming a low leakage annular seal around a shaft within a gas turbine engine or other rotating machine, which does not impart undesirable twisting forces to the seal fingers and which reliably achieves seal lift-off during high speed rotation of a shaft to reduce seal wear, to prolong seal life, and to avoid the need for a prolonged seal break-in process. Ideally, embodiments of such a lift-off finger seal would also be radially- and axially-compact, lightweight, and relatively inexpensive to manufacture. It would also be desirable to provide embodiments of a gas turbine engine including such a lift-off finger seal, as well as embodiments of a method for manufacturing such a finger seal. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a gas turbine engine are provided. In one embodiment, the gas turbine engine includes an engine housing having low and high pressure cavities, a shaft rotatably mounted in the engine housing, and a lift-off finger seal. The lift-off finger seal includes an finger seal backing spring and an aerodynamic foil. The aerodynamic foil extends around the outer circumference of the shaft and is configured to expand radially outward in response to aerodynamic forces generated during rotation of the shaft. The finger seal backing spring resiliently biases the aerodynamic foil toward the shaft, deflects to accommodate the outward radial expansion of the aerodynamic foil, and forms an annular seal around the aerodynamic foil to impede pressurized airflow from the high to low pressure zone.

Embodiments of a lift-off finger seal configured to form a seal around a rotating shaft are further provided. In one embodiment, the lift-off finger seal includes a finger seal retaining structure, a finger seal backing spring, and an aerodynamic foil. The finger seal backing spring includes, in turn, an outer circumferential flange portion fixedly coupled to the finger seal retaining structure, and a plurality of radially-resilient fingers extending radially inward from the outer circumferential flange portion. The aerodynamic foil includes a generally annular foil body extending around an inner circumference of the plurality of radially-resilient fingers; and a series of retention tabs circumferentially-spaced about the longitudinal axis of the aerodynamic foil, extending radially outward from an edge of the generally annular foil body, and contacting a face of the plurality of radially-resilient fingers.

Embodiments of a method for the manufacture a lift-off foil seal are still further provided. In one embodiment, the method includes the steps of machining a flexible sheet of material to include a series of axially-extending tabs, rolling flexible sheet of material into a generally cylindrical shape, bending the series of axially-extending tabs outward to produce an aerodynamic foil having a series of radially-extending retention tabs, and positioning a finger seal backing spring around the aerodynamic foil such that a face of the finger seal contacts the series of radially-extending retention tabs.

BRIEF DESCRIPTION OF THE DRAWINGS

At least one example of the present invention will hereinafter be described in conjunction with the following figures, wherein like numerals denote like elements, and:

FIG. 6 is a cross-sectional view of a portion of the lift-off finger seal shown in FIGS. 2-5 taken along line 6-6 (identified in FIG. 2) illustrating a first exemplary anti-rotation feature, which may be included within the finger seal to prevent rotation between the aerodynamic foil and the finger seal retaining structure;

FIG. 7 is a cross-sectional view of a portion of a lift-off finger seal similar to that shown in FIGS. 2-6, but including a second exemplary anti-rotation feature in accordance with a further exemplary embodiment; and FIG. 8 is a cross-sectional view of a portion of a lift-off finger seal illustrated in accordance with a still further exemplary embodiment of the present invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "lift-off finger seal," as appearing herein, denotes finger seals including aerodynamic foils, which are supported by finger seal backing springs of the type described below; which extend around a shaft (e.g., the spool of a gas turbine engine) in a close tolerance fit when the shaft is in a cold, static condition or rotating at a relatively low rate of speed; and which expand radially outward (grow in inner diameter) in response to aerodynamic forces generated during high speed rotation of the shaft. The term "lift-off finger seal" thus encompasses non-contacting finger seals wherein the aerodynamic foil is separated from the shaft by a small annular gap when the shaft is stationary or rotating at a relatively low rate of speed, as well as intermittently-contacting fingers seals wherein the foil contacts the outer circumference surface of the shaft when the shaft is stationary or rotating at a relatively low rate of speed. Similarly, the term "lift-off," as appearing herein, is utilized to denote the radial expansion of an aerodynamic foil in response to aerodynamic forces produced during high speed rotation of the shaft around which the foil is disposed.

Figure 1:
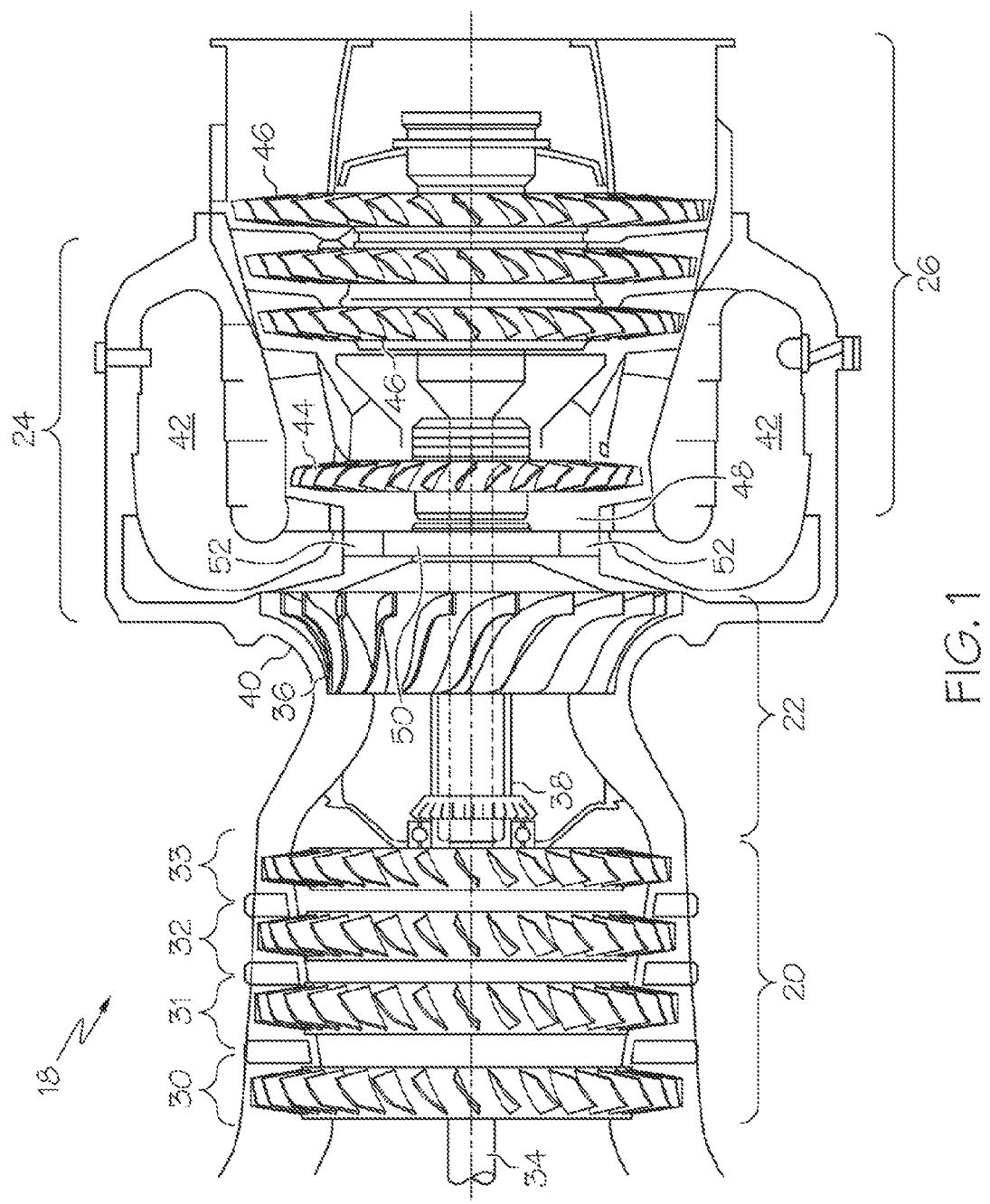
FIG. 1 is a schematic illustrating an exemplary gas turbine engine (partially shown) including a low pressure compressor section, a high pressure compressor section, a combustor section, and a turbine section.

FIG. 1 is a generalized schematic of a portion of a gas turbine engine (GTE) 18 including a low pressure compressor section 20, a high pressure compressor section 22, a combustor section 24, and a turbine section 26. In this particular example, low pressure compressor section 20 includes a plurality of axial compressor stages 30-33, which each include an axial compressor mounted to a low pressure (LP) spool or shaft 34. High pressure compressor section 22 is positioned immediately downstream of low pressure compressor section 20 and includes a single centrifugal compressor or impeller 36. Centrifugal impeller 36 is mounted to a high pressure (HP) shaft 38, which is co-axial with LP shaft 34 and through which LP shaft 34 extends. A shroud 40 encloses impeller 36 to guide airflow exhausted by impeller 36 into combustor section 24. Combustor section 24 includes at least one combustor 42 having an outlet nozzle, which directs combustive gas flow into turbine section 26. More specifically, the outlet nozzle of combustor 42 directs combustive gas flow from combustor section 24, through a high pressure turbine 44 mounted to HP shaft 38, and subsequently through a series of low pressure turbines 46 mounted to LP shaft 34. Although not illustrated in FIG. 1 for clarity, GTE 18 further includes additional sections, such as an intake section (e.g., a fan module) upstream of compressor section 20 and an exhaust section downstream of turbine section 26.

During GTE operation, the axial compressors within compressor stages 30-33 rotate in conjunction with LP shaft 34 to compress airflow received from the intake section of GTE 18. The compressed airflow is supplied to high pressure compressor section 22 and further compressed by impeller 36, which rotates in conjunction with HP shaft 38. The hot, compressed airflow is then directed into combustion chamber 42, mixed with fuel, and ignited. The air heats rapidly, expands, and flows from combustion chamber 42 and into the inlet of high pressure turbine 44. The combustive gas flow drives the rotation of turbine 44 and, therefore, the rotation of HP shaft 38 and impeller 36. After being exhausted from high pressure turbine 44, the combustive gases flow through low pressure turbines 46 to drive the rotation of turbines 46 and, therefore, the rotation of LP shaft 34 and the axial compressors within compressor stages 30-33. The power output of GTE 18 may be utilized in a variety of different manners, depending upon whether GTE 18 assumes the form of a turbofan, turboprop, turboshaft, turbojet engine, or an auxiliary power unit, to list but a few examples.

Considerable energy is expended to compress the intake air within compressor sections 20 and 22 before the compressed air is supplied to combustion section 24 for fuel injection and combustion. The air pressure at the outlet end or exducer end of impeller 36 will typically be higher than the pressure within the adjoining cavity 48 in which HP turbine 44 is rotatably mounted. To optimize engine performance, it is desirable to minimize leakage of pressurized airflow from the outlet of impeller 36 directly into high pressure turbine cavity 48. For this reason, an air-to-air shaft seal 50 may be positioned around HP shaft 38 between impeller 36 and HP turbine 44 and affixed to an internal mounting structure 52 provided within GTE 18, as generically illustrated in FIG. 1. While labyrinth seals, conventional contacting-type finger seals, and other types of seals are known that are generally suitable for usage as air-to-air shaft seal 50, the integrity of such conventionally-known seals tend to degrade over time due to continuous or intermittent contact between spinning and stationary components, as described in the foregoing section entitled "BACKGROUND." Thus, in accordance with embodiments of the present invention, air-to-air shaft seal 50 assumes the form of a lift-off finger seal, which not only provides excellent sealing properties similar to those achieved by conventional contacting-type finger seals, but which also lifts-off from or further separates from the shaft during high speed rotation to reduce seal wear and preserve seal integrity over the operational lifespan of GTE 18. Exemplary embodiments of such lift-off finger seals suitable for usage as air-to-air shaft seal 50 are described more fully below in conjunction with FIGS. 2-8.

Before embarking on a description of exemplary embodiments of the lift-off finger seal, it should be noted that the placement of air-to-air shaft seal 50 shown in FIG. 1 is provided by way of example only and that embodiments of the lift-off finger seal described herein can be positioned at any location within a gas turbine engine (or other rotating machine) wherein it is desired to prevent leakage of pressurized air (or other fluid) by forming an annular seal around a spinning shaft. For example, in further embodiments, the lift-off finger seal may be positioned around the high pressure turbine cooling system (not shown in FIG. 1) to prevent leakage of the core airflow (e.g., the combustive gasses exhausted from combustion chamber 42) into the cooling flow passages conducting secondary airflow. It should also be readily appreciated that GTE 18 is provided by way of example only and that embodiments of lift-off finger seal can be utilized within numerous other types of gas turbine engine platforms, as well as within various other types of rotating machines including, but not limited to, other types of turbomachines, such as turbochargers. Embodiments of the lift-off finger seal described herein may also be utilized to fluidly isolate high and low pressure zones containing fluids other than pressurized air; e.g., in certain instances, embodiments of the lift-off finger seal may be employed as an air-to-oil seal.

Figure 2:
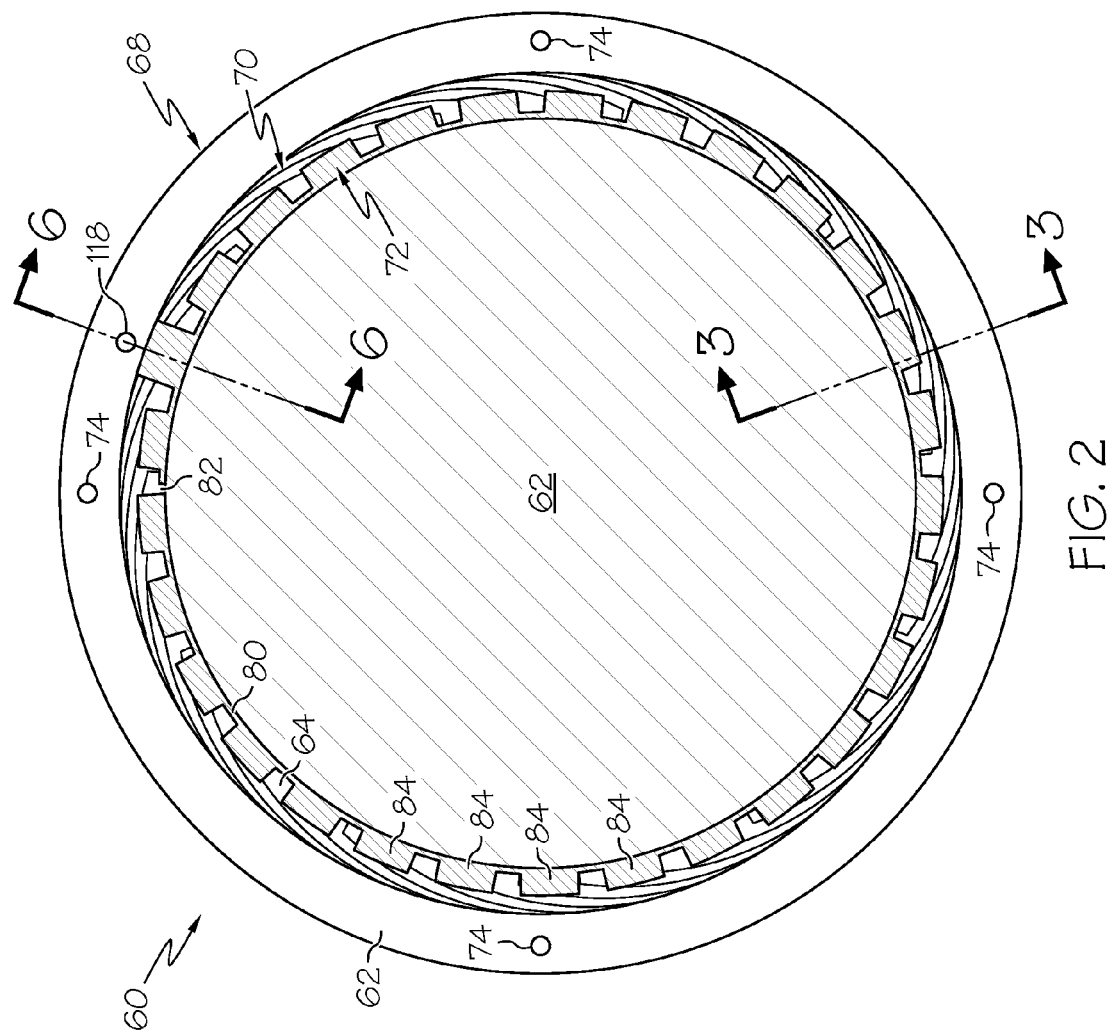
FIG. 2 is a plan view of a lift-off finger seal suitable for usage within the gas turbine engine shown in FIG. 1 and illustrated in accordance with an exemplary embodiment of the present invention.
Figure 3:
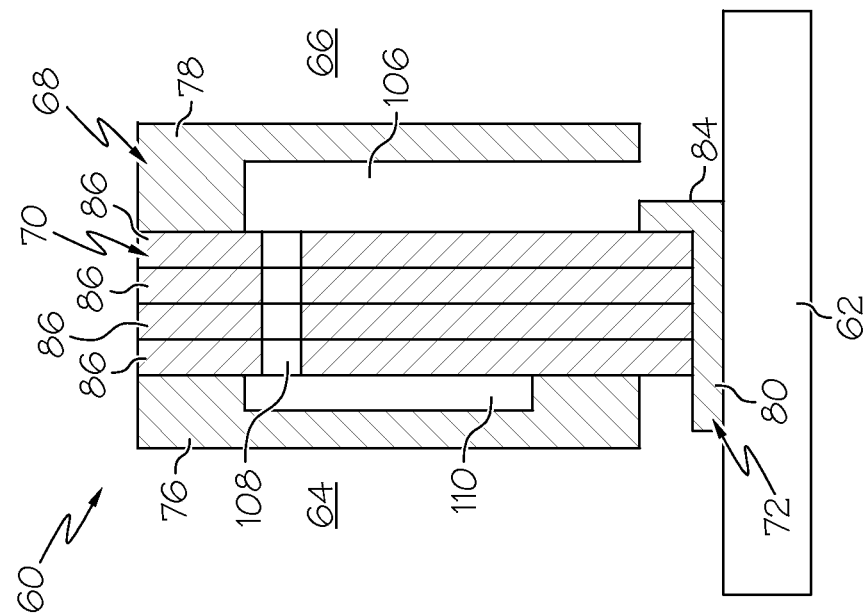
FIG. 3 is a cross-sectional view of a portion of the lift-off finger seal shown in FIG. 2 taken along line 3-3 (identified in FIG. 2) prior to high speed rotation of the shaft and seal lift-off.

FIG. 2 is a plan view of lift-off finger seal 60 illustrated in accordance with an exemplary embodiment of the present invention, and FIG. 3 is a cross-sectional view of a portion of lift-off finger seal 60 taken along line 3-3 in FIG. 2. Lift-off finger seal 60 is positioned around a shaft 62, which extends between a low pressure zone 64 and a neighboring high pressure zone 66 (shown in FIG. 3). As appearing herein, the term "low pressure zone" is utilized in a relative sense to denote a cavity or area containing a fluid at a pressure lower than the fluid within a neighboring cavity or area during operation of a gas turbine engine. Conversely, the term "high pressure zone" denotes a cavity or other area containing a fluid pressure higher than that contained within a neighboring cavity or area during engine operation. Thus, in the above-described example wherein lift-off finger seal 60 is employed as air-to-air shaft seal 50 within GTE 18 shown in FIG. 1, the engine cavity in which impeller 36 is rotatably mounted may encompass or otherwise be included within the high pressure zone, while turbine cavity 48 may encompass or otherwise be included within the low pressure zone.

Finger seal retaining structure 68 may include any number of structural elements suitable for securing finger seal backing spring 70 within a gas turbine engine (or other rotating machine) around shaft 62 and between low pressure zone 64 and high pressure zone 66. In the illustrated example, finger seal retaining structure 68 includes a low pressure cover plate 76 (shown in FIG. 3) and an opposing high pressure cover plate 78 (shown in FIGS. 2 and 3), which are positioned against opposing sides of finger seal backing spring 70. More specifically, low pressure cover plate 76 is positioned the face of backing spring 70 exposed to the fluid within low pressure zone 64 (referred to herein as the "low pressure face" of backing spring 70), while high pressure cover plate 78 is positioned over the face of backing spring 70 exposed to the fluid within high pressure zone 66 (referred to herein as the "high pressure face" of backing spring 70). As shown most clearly in FIG. 2, a plurality of fastener openings 74 (FIG. 2) may be formed through finger seal retaining structure 68 (e.g., through cover plates 76 and 78) to facilitate attachment to a corresponding mounting structure provided within the gas turbine engine, such as internal mounting structure 52 shown in FIG. 1. This example notwithstanding, various other mounting hardware or techniques can be utilized to secure finger seal retaining structure 68 to the static engine infrastructure including, for example, a clamp ring.

Aerodynamic foil 72 includes a relatively thin, flexible, annular foil body 80, which is disposed around shaft 62 and which is generally conformal with the outer contour of shaft 62. While extending around or essentially circumscribing an outer circumference of shaft 62, annular foil body 80 does not form a complete loop or a continuous ring around shaft 62. Instead, a relatively narrow axial gap 82 separates opposing longitudinal edges of annular foil body 80. A number of radial tabs 84 are joined to a circumferential edge of annular foil body 80 and extend outward therefrom in a generally radial direction. Radial tabs 84 may be circumferentially spaced about the longitudinal axis of aerodynamic foil 72 at substantially regular intervals; however, this is by no means necessary. As shown most clearly in FIG. 3, radial tabs 84 abut an inner circumference portion of the high pressure face of finger seal backing spring 70. In so doing, radial tabs 84 prevent forced dislodgement or "blow through" of aerodynamic foil 72 due to the pressure differential across lift-off finger seal 60. In preferred embodiments, and as indicated in the illustrated exemplary embodiment, aerodynamic foil 72 is provided with a relatively large number of radial tabs 84, which each have a relatively narrow width to maintain the overall flexibility of aerodynamic foil 72. In additional embodiments, aerodynamic foil 72 may be further provided with a second set of radial tabs, which are joined to the opposing circumferential edge of annular foil body 80 to further maintain aerodynamic foil 72 in its proper position, such as tabs 154 shown in FIG. 8 (described below).

Annular foil body 80 and radial tabs 84 are preferably integrally fabricated as a single piece. In one embodiment, aerodynamic foil 72 is manufactured as a flexible strip or sheet of material, which is rolled into a cylinder having an inner diameter substantially equivalent with the outer diameter of shaft 62. During such a manufacturing process, a sheet of material may first be cut into desired dimensions, machined to define a plurality of axially-extending tabs along one or both of the sheet's lateral edges, and rolled into the desired cylindrical shape. The axially-extending tabs may be bent outward to define radial tabs 84 either prior to or after rolling utilizing, for example, a specialized fixture. The sheet of material from which aerodynamic foil 72 may include one or more layers; e.g., a substrate and a solid-film lubricant layer, which formed over the inner face of the substrate to minimize friction with the outer circumference surface of shaft 62. Suitable materials include those utilized in the production of foil bearings, such as a nickel-based superalloy (e.g., an INCONEL® brand superalloy).

Figure 4:
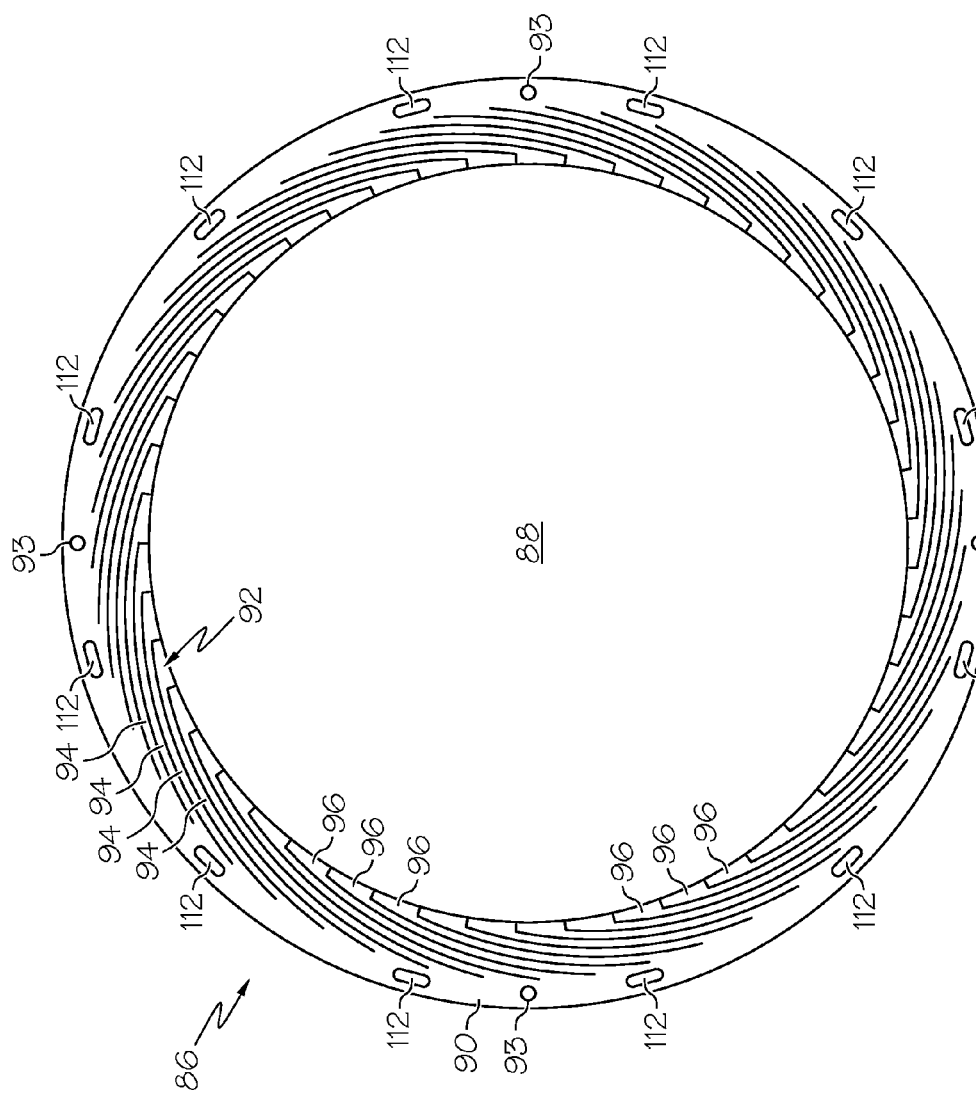
FIG. 4 is a plan view of an exemplary finger seal backing spring laminate that may be included within the lift-off finger seal shown in FIGS. 2 and 3.

Finger seal backing spring 70 is conveniently, although not necessarily, fabricated from a stack of disc-shaped laminates 86; e.g., backing spring 70 may be comprised of three to six laminates 86, which may be clamped together utilizing, for example, a plurality of rivets, bolts, or other such fasteners. FIG. 4 illustrates one such laminate 86, which may be generally representative of each of laminates 86 included within backing spring 70. As can be seen, the laminate 86 illustrated in FIG. 4 assumes the form of a relatively thin, annular disc having a central opening 88, an outer circumferential flange portion 90, and an inner circumferential portion 92. A plurality of circumferentially-spaced openings 93 may be provided in outer circumferential flange portion 90 to facilitate attachment of backing spring 70 to cover plates 76 and 78 of retaining structure 68 (FIGS. 2 and 3) utilizing a plurality of fasteners. A plurality of slits have been created within inner circumferential portion 92 by, for example, machining to define a plurality of elongated fingers 94 (four of which are labeled in FIG. 4). Fingers 94 extend radially inward from outer flange portion 90 and generally follow a spiral-shaped path, which twists about the longitudinal axis of lift-off finger seal 60. As further shown in FIG. 4, fingers 94 may be fabricated to include slightly enlarged inner terminal ends 96, which collectively present a relatively smooth, continuous inner circumferential surface for contact with aerodynamic foil 72 to facilitate sliding movement between fingers 94 and foil 72, as described below. Laminates 86 can be fabricated from a high temperature metal or alloy, such as a cobalt-based superalloy (e.g., HAYNES 25®), a nickel-based superalloy (e.g., INCONEL 718®), or another high temperature capable material.

Finger seal backing spring 70 exerts a circumferential preload on aerodynamic foil 72 to bias annular foil body 80 toward shaft 62. As a result of this bias and the dimensions of foil 72, aerodynamic foil 72 extends around the outer circumference of shaft 62 in a close tolerance fit when shaft 62 is stationary or rotating at a relatively low rate of speed. In the illustrated exemplary embodiment shown in FIGS. 2-4, aerodynamic foil 72 circumferentially contacts or engages the outer surface of shaft 62 when shaft 62 is in a cold, static condition. Alternatively, aerodynamic foil 72 may closely conform to the outer surface of the shaft in the cold, static condition, but may be separated or radially-offset therefrom by a small annular gap to better accommodate significant disparities in radial growth due to centrifugal forces and/or thermal expansion occurring during operation of lift-off finger seal 60. In either case, when the rotational speed of shaft 62 surpasses a predetermined threshold, fingers 94 of finger seal backing spring 70 deflect outward in radial directions to accommodate the circumferential expansion of aerodynamic foil 72, as described below in conjunction with FIG. 5.

Figure 5:
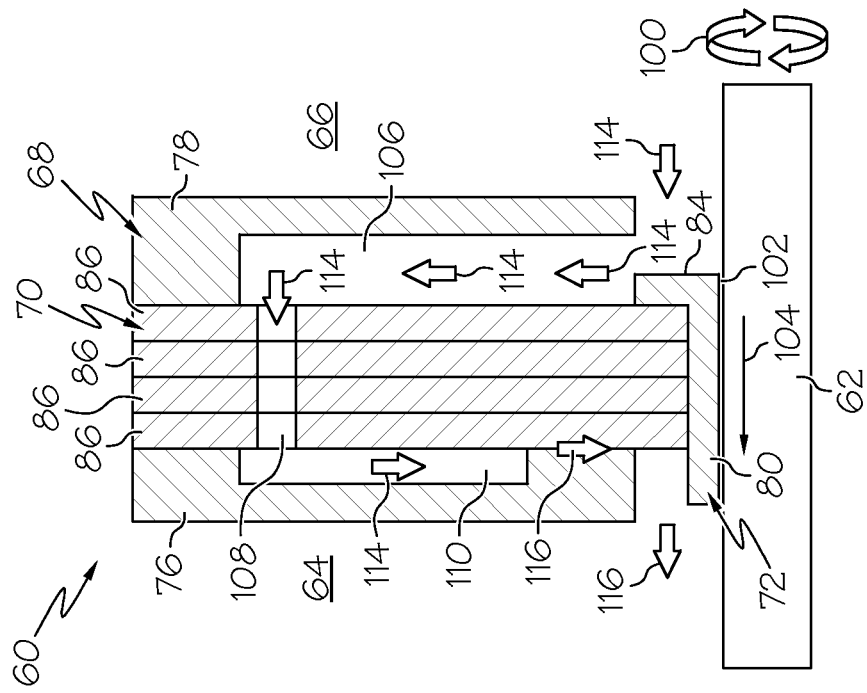
FIG. 5 is a cross-sectional view of a portion of the lift-off finger seal shown in FIG. 2-4 taken along line 3-3 (identified in FIG. 2) during high speed rotation of the shaft and seal lift-off.

FIG. 5 illustrates finger seal 60 during high speed rotation of shaft 62 (represented by arrows 100) and seal lift-off. As can be seen in FIG. 5, aerodynamic foil 72 has lifted from the outer circumferential surface of shaft 62 in response to aerodynamic forces generated by rotation of shaft 62, which draws airflow into a moving convergent wedge formed by shaft 62 and aerodynamic foil 72. As a result of gap 82 (FIG. 2) and the compliancy of annular foil body 80, aerodynamic foil 72 is able to deflect in a radially outward direction and circumferentially expand in response to aerodynamic forces generated during high speed rotation of shaft 62. A small annular gap or clearance 102 is thus created separating shaft 62 and aerodynamic foil 72 (or, in embodiments wherein foil 72 does not contact the outer surface of shaft 62 when stationary or slowly rotating, the radial width annular gap of the annular gap between shaft 62 and foil 72 increases during seal lift-off). As indicated in FIG. 5 by arrow 104, annular clearance 102 allows a low, controlled leakage across finger seal 60. Radially-resilient fingers 94 deflect in a radial direction to accommodate circumferential expansion of aerodynamic foil 72 and seal-lift. As a result of this clearance, contact between aerodynamic foil 72 and shaft 62 is avoided during high speed rotation of shaft 62 thereby minimizing abrasion of foil 72 and allowing finger seal 60 to maintain its sealing properties over the operational lifespan of the gas turbine engine in which seal 60 is employed.

Finger seal backing spring 70 further deflects, as needed, to accommodate radial displacement of aerodynamic foil 72, which follows shaft 62 during radial displacement thereof. In contrast to axially-elongated finger pads utilized in previous non-contacting finger seal concepts, aerodynamic foil 72 is relatively compact in an axial direction and avoids imparting undesirable twisting forces to fingers 94 (FIG. 4) of finger seal backing spring 70. In this manner, finger seal backing spring 70 creates an annular seal around shaft 62, which moves radially in conjunction with displacement of shaft 62, to minimize the leakage of pressurized fluid from high pressure cavity 66 into low pressure cavity 64. Finger seal backing spring 70 provides an effective seal impeding pressurized airflow across seal 60 due to the close-contacting design of fingers 94 (FIG. 4); that is, the slits defining fingers 94 are relatively narrow. In addition, each laminate 86 may be slightly rotated or angularly staggered with respect to its neighboring laminate or laminates 86 about the longitudinal axis of lift-off finger seal 60 such that the slits defining fingers 94 do not align to further discourage pressurized airflow through finger seal backing spring 70. The stiffness of fingers 94 (FIG. 4) included within laminates 86 may be uniform or may instead vary in an axial direction.

In certain embodiments, lift-off finger seal 60 may further be provided with a pressure balance circuit. For example, as shown in FIG. 5, lift-off finger seal 60 may include a pressure balance circuit having an inlet flow passage 106, an axial flow passage 108, and a pressure balance cavity 110. In this case, inlet flow passage 106 may have a generally annular geometry and is defined by the high pressure face of finger seal backing spring 70 and a stepped or recessed inner portion of high pressure cover plate 78. Axial flow passage 108 is formed through finger seal backing spring 70 by a plurality of openings 112 (identified in FIG. 4) formed through each laminate 86, which align axially when backing spring 70 is fully assembled. Lastly, pressure balance cavity 110 may be defined by the low pressure face of finger seal backing spring 70 and an annular groove formed within an interior portion of low pressure cover plate 76. As a result of this configuration, pressurized airflow is permitted to flow into inlet flow passage 106, through axial flow passage 108, and into pressure balance cavity 110 during engine operation (indicated in FIG. 4 by arrows 114). This decreases the pressure differential across finger seal backing spring 70 to minimize unwanted distortion and to reduced freedom of motion due to friction of backing spring 70 in axial directions. As further indicated in FIG. 4 by arrows 116, a relatively low leakage of pressurized airflow may also occur from pressure balance cavity 110, between the inner circumferential portion of low pressure cover plate 78 and the low pressure face of backing spring 70, and into low pressure zone 64.

To permit the radial deflection of finger seal backing spring 70 and circumferential expansion of aerodynamic foil 72, a certain amount of sliding is permitted to occur in tangential directions between the fingers of backing spring 70 and aerodynamic foil 72. However, it is generally preferred that aerodynamic foil 72 is rotationally fixed with respect to finger seal retaining structure 68, as taken about the longitudinal axis of lift-off finger seal 60. To this end, lift-off foil seal 60 may be further equipped with an anti-rotation feature. FIG. 6 is a cross-sectional view of lift-off finger seal 60 taken along line 6-6 in FIG. 2 and illustrating one such anti-rotation feature, namely, an anti-rotation pin 118. As can be seen in FIG. 6, anti-rotation pin 118 extends in an axial direction from an opening 120 provided in finger seal retaining structure 68, and specifically in high pressure cover plate 78, and into an axially-aligning slot 122 provided in a radially-elongated tab 84. A radial clearance is provided in slot 122 to permit pin 118 to slide within slot 122 as aerodynamic foil 72 circumferentially expands during seal lift-off. This example notwithstanding, the anti-rotation feature may assume other forms suitable for preventing or at least restricting the rotation of foil 72 with respect to retaining structure 68. For example, in an alternative embodiment shown in FIG. 7, the anti-rotation feature comprises a radially-elongated slot 124, which is formed within an inner circumferential surface of high pressure cover plate 78 and which matingly receives a radially-elongated tab 84. As was the case previously, a radial clearance 126 may be provided within radially-elongated slot 124 to permit tab 84 to slide within slot 124 in a radially outward direction in conjunction with circumferential expansion of aerodynamic foil 72 during seal lift-off.

FIG. 8 is a cross-sectional view of lift-off finger seal 130 disposed around a shaft 62 between a low pressure zone 64 and a high pressure zone 66, as illustrated in accordance with a further exemplary embodiment of the present invention. In many respects, lift-off finger seal 130 is similar finger seal 60 described above in conjunction with FIGS. 2-7. For example, finger seal 130 includes a finger seal retaining structure 132; a finger seal backing spring 134, which includes an outer circumferential portion 136 affixed to retaining structure 132 and a plurality of radially-resilient fingers 138 extending radially inward from outer circumferential portion 136; and an aerodynamic foil 140, which extends around an inner circumference of radially-resilient fingers 138 and around an outer circumference of shaft 62. As was the case previously, a pressure balance circuit 142 is provided within lift-off finger seal 130, which includes an axially-extending flow passage 146 and a pressure balance cavity 148 bounded by finger seal retaining structure 132 and the low pressure face of finger seal backing spring 134.

With continued reference to finger seal 130 shown in FIG. 8, and in contrast to above-described finger seal 60, axially-extending flow passage 146 of pressure balance circuit 142 is formed through finger seal retaining structure 132. In addition, aerodynamic foil 140 is fabricated to include two opposing sets of retention tabs, namely, a first series of retention tabs 150, which extend radially outward from the high pressure edge of annular foil body 152 and contact the high pressure face of backing spring 134; and a second a second series of retention tabs 154, which extend radially outward from the high pressure edge of annular foil body 152 and contact the low pressure face of backing spring 134. As a still further difference, in the exemplary embodiment shown in FIG. 8, shaft 62 has been machined to include a plurality of grooves 156, which enhance or promote the generation of aerodynamic lift during high speed rotation of shaft 62. In further embodiments, the shaft around which the finger seal is disposed may be fabricated to include various other types of lift-generating features or geometries including those described in U.S. Pat. No. 6,811,154, issued Nov. 2, 2004, and entitled "NONCONTACTING FINGER SEAL."

The foregoing has thus provided embodiments of a gas turbine engine including a lift-off finger seal that reliably achieves lift-off during high speed rotation of a shaft around which the finger seal is disposed to minimize contact between the lift-off finger seal and the spinning shaft. This results in reduced seal wear thereby negating the need for a prolonged break-in procedure often performed for other conventionally-known contacting seals. Such a lift-off design also helps to maintain the performance of the finger seal at optimal levels over the operational lifespan of the gas turbine engine (or other rotating machine) in which the finger seal is deployed. Embodiments of the lift-off finger seal described herein are also better able to follow the shaft during radial displacement thereof and provide lower leakage levels as compared to labyrinth seals thereby improving overall engine performance. As a still further advantage, the above-described embodiments of the lift-off finger seal are radially- and axially-compact, lightweight, and relatively inexpensive to manufacture. While described above primarily in the context of a gas turbine engine, embodiments of the lift-off finger seal can be utilized within other turbomachines and rotating machines generally wherein it is desired to form an annular seal around a rotating shaft to minimize leakage from a high pressure zone or cavity to a low pressure zone or cavity.

The foregoing has also provided embodiments of a method for manufacturing a lift-off finger seal. For example, in one implementation, the lift-off foil seal may be manufactured by machining a flexible sheet of material to include a series of axially-extending tabs, rolling flexible sheet of material into a generally cylindrical shape, bending the series of axially-extending tabs outward to produce an aerodynamic foil having a series of radially-extending retention tabs, positioning a finger seal backing spring around the aerodynamic foil such that a face of the finger seal contacts the series of radially-extending retention tabs. The step of bending the series axially-extending tabs outward may be performed prior to or after the step of rolling. In certain embodiments, the method may further include the step of installing the lift-off foil seal around a shaft or spool included within a gas turbine engine.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:
1. A gas turbine engine, comprising:
an engine housing containing a high pressure zone and a low pressure zone during operation of the gas turbine engine;
a shaft rotatably mounted in the engine housing and extending from the low pressure zone to the high pressure zone; and
a lift-off finger seal, comprising:
an aerodynamic foil extending around the outer circumference of the shaft and configured to expand radially outward in response to aerodynamic forces generated during rotation of the shaft;
a finger seal backing spring biasing the aerodynamic foil toward the shaft, deflecting to accommodate the outward radial expansion of the aerodynamic foil, and forming an annular seal around the shaft to impede pressurized airflow from the high pressure zone to the low pressure zone; and
a finger seal retaining structure securing the finger seal backing spring to the engine housing;
wherein the finger seal backing spring comprises a plurality of disc-shaped laminates, each disc-shaped laminate comprising:
an outer circumferential flange portion fixedly coupled to the finger seal retaining structure; and
a plurality radially-resilient fingers extending radially inward from the outer circumferential flange portion to contact an outer circumferential surface of the aerodynamic foil.
2. A gas turbine engine according to claim 1 wherein the finger seal backing spring extends radially inward from the finger seal retaining structure to the aerodynamic foil to form an annular seal between the finger seal retaining structure and the aerodynamic foil.

3. A gas turbine engine according to claim 1 further comprising an anti-rotation feature coupled between the finger seal retaining structure and the aerodynamic foil, the anti-rotation feature preventing the aerodynamic foil from rotating with respect to the finger seal retaining structure about the longitudinal axis of the lift-off finger seal.

4. A gas turbine engine according to claim 3 wherein the aerodynamic foil comprises:
   a generally annular foil body positioned between the shaft and the finger seal backing spring, the generally annular foil body having a high pressure edge exposed to fluid within the high pressure zone; and
   a first series of retention tabs circumferentially-spaced about the longitudinal axis of the aerodynamic foil and extending radially outward from the high pressure edge of the generally annular body.

5. A gas turbine engine according to claim 4 wherein the anti-rotation feature engages a first retention tab included within the first series of retention tabs.

6. A gas turbine engine according to claim 5 wherein the anti-rotation feature comprises an anti-rotation pin extending into an opening provided in the first retention tab and into an axially-aligning opening provided in the finger seal retaining structure.

7. A gas turbine engine according to claim 6 wherein the opening provided in the first retention tab comprises a radially-elongated slot sized to permit sliding movement between the anti-rotation pin and the first retention tab in a radial direction in conjunction with circumferential expansion of the aerodynamic foil.

8. A gas turbine engine according to claim 4 wherein the finger seal backing spring has a high pressure face exposed to fluid within the high pressure zone, and wherein the first series of retention tabs abut the high pressure face of the finger seal backing spring.

9. A gas turbine engine according to claim 8 wherein the generally annular foil body further comprises a low pressure edge exposed to fluid within the low pressure zone, and wherein the aerodynamic foil further comprises:
   a second series of retention tabs circumferentially-spaced about the longitudinal axis of the aerodynamic foil and extending radially outward from the low pressure edge of the generally annular body.

10. A gas turbine engine according to claim 4 wherein the anti-rotation feature comprises a slot formed in an inner circumferential surface of the finger seal retaining structure and into which a first retention tab included within the first series of retention tabs extends.

11. A gas turbine engine according to claim 10 wherein a radial clearance is provided between the outer terminal end of the first retention tab and the endwall of the slot when the aerodynamic foil contacts the shaft to permit sliding movement of the first retention tab within the slot in a radial direction in conjunction with circumferential expansion of the aerodynamic foil.

12. A gas turbine engine according to claim 1 wherein the lift-off finger seal further comprises a pressure balance circuit defined, at least in part, by the finger seal retaining structure and the finger seal backing spring.

13. A gas turbine engine according to claim 12 wherein the finger seal backing spring has a high pressure face exposed to pressurized air within high pressure zone, and wherein the finger seal retaining structure further comprises a high pressure cover plate positioned over the high pressure face of the finger seal backing spring.

14. A gas turbine engine according to claim 13 wherein the pressure balance circuit comprises a pressure balance cavity formed between the high pressure cover plate and the high pressure face of the finger seal backing spring.

15. A lift-off finger seal configured to form a seal around a rotating shaft, the lift-off finger seal comprising:
   a finger seal retaining structure;
   a finger seal backing spring, comprising:
      an outer circumferential flange portion attached to the finger seal retaining structure; and
      a plurality radially-resilient fingers extending radially inward from the outer circumferential flange portion;
   an aerodynamic foil, comprising:
      a generally annular foil body extending around an inner circumference of the plurality of radially-resilient fingers; and
      a series of retention tabs circumferentially-spaced about the longitudinal axis of the aerodynamic foil, extending radially outward from an edge of the generally annular foil body, and contacting a face of the plurality of radially-resilient fingers; and
   an anti-rotation pin extending from the finger seal retaining structure into a radially-elongated slot provided in one of the series of retention tabs and having a radial clearance permitting sliding movement of the anti-rotation pin within the radially-elongated slot in conjunction with circumferential expansion of the aerodynamic foil.

16. A lift-off finger seal configured to form a seal around a rotating shaft, the lift-off finger seal comprising:
   a finger seal retaining structure;
   a finger seal backing spring;
      an outer circumferential flange portion fixedly coupled to the finger seal retaining structure; and
      a plurality of radially-resilient fingers extending radially inward from the outer circumferential flange portion;
   an aerodynamic foil, comprising:
      a generally annular foil body extending around an inner circumference of the plurality of radially-resilient fingers; and
      a plurality of retention tabs circumferentially-spaced about the longitudinal axis of the aerodynamic foil, extending radially outward from an edge of the generally annular foil body, and contacting a high pressure face of the plurality of radially-resilient fingers; and
   a pressure balance circuit having an inlet flow passage located radially adjacent the plurality of retention tabs.

17. A lift-off finger seal according to claim 16 further comprising an anti-rotation tab extending from the finger seal retention structure, through the inlet flow passage, and into a radially-elongated slot formed in one of the retention tabs to prevent rotation of the aerodynamic foil with respect to the finger seal retaining structure about a longitudinal axis of the lift-off finger seal.

18. A lift-off finger seal according to claim 16 wherein the pressure balance circuit comprises an axially-extending flow passage formed through the finger seal retaining structure.

* * * * *